United States Patent [19]

Tatsuno

[11] 3,821,898

[45] July 2, 1974

[54] PISTON TYPE FLOW METER

[76] Inventor: Hiyoshi Tatsuno, 4-4-11 Shirogane, Minato-ku, Tokyo, Japan

[22] Filed: Aug. 7, 1972

[21] Appl. No.: 278,390

[30] Foreign Application Priority Data

Aug. 16, 1971 Japan .............................. 46-61641
June 9, 1972 Japan .............................. 47-56845

[52] U.S. Cl. .............................................. 73/251
[51] Int. Cl. ............................................ G01f 3/16
[58] Field of Search ....................... 73/251, 270, 225

[56] References Cited

UNITED STATES PATENTS

| | | | |
|---|---|---|---|
| 455,244 | 6/1891 | Ahrbecker | 73/251 |
| 2,860,512 | 11/1958 | Hoerner | 73/251 |
| 2,860,513 | 11/1958 | Cheronnet | 73/251 |
| 3,369,398 | 2/1968 | Porter et al. | 73/270 |

FOREIGN PATENTS OR APPLICATIONS

| | | | |
|---|---|---|---|
| 214,933 | 8/1941 | Switzerland | 73/270 |

*Primary Examiner*—Charles A. Ruehl
*Attorney, Agent, or Firm*—Watson, Cole, Grindle & Watson

[57] ABSTRACT

The present piston type flow meter is a small sized flow meter for measuring accurately the flow quantity of kerosene or the like used for heating, and comprises a piston dividing the container for said flow meter into upper and lower chambers, an indicator for integrating the number of strokes of said piston, and a change-over rotary valve for coupling selectively the upper and lower chambers, divided by the piston, with a flow inlet and a flow outlet of the container, and wherein a tumbler mechanism operated through the reciprocation of the piston and transmitting the stroke of piston to said change-over rotary valve is controlled by a restraining means for operating said mechanism when a predetermined position of the piston is reached.

6 Claims, 19 Drawing Figures

PISTON TYPE FLOW METER

BACKGROUND OF THE INVENTION

The present invention relates to a piston type, small flow meter for measuring accurately the quantity of kerosene or the like consumed by a heater used at a home or in an office.

Heretofore, piston type flow meters have been used to measure gasoline or the like, however, they have all been relatively large whereas small flow meters, of high precision even when used with kerosene, etc. which may contain dust or the like, have been few.

In addition, in order to improve the precision of the meter the size precision of every part must be of a high degree, and this results in increasing the time used in manufacturing and assembling the parts used, and accordingly in raising the manufacturing cost.

OBJECTS OF THE INVENTION

One object of the present invention is to provide a piston type flow meter in which a restraining means is provided on the tumbler mechanism of a change-over rotary valve and, even though there is some variation in the resistance due to mechanical friction of the tumbler the reversing point thereof does not vary and accurate measuring can be effected.

Another object of the present invention is to provide a piston type flow meter provided with a restraining means allowing easy adjustment of an error of the flow meter by advancing or retarding the reversing point of said tumbler mechanism.

Another object of the present invention is to provide a piston type flow meter which is easy to work on, assemble, and adjust on the spot, by improving the construction of the restraining means of said tumbler mechanism.

Still another object of the present invention is to provide a piston type flow meter which does not become inoperative by reason of dust in the sliding portion of the change-over valve, even though used for oil into which dust may intermix, as kerosene.

Still another object of the present invention is to provide a piston type flow meter in which, by providing on the piston a pin for preventing the piston from turning, the piston can, by turning, bring about variations in the exhaust flow quantity.

DETAILED DESCRIPTION OF THE INVENTION

With referene to the drawings, the structure of the several embodiments in accordance with the present invention will now be described.

Figure 1:
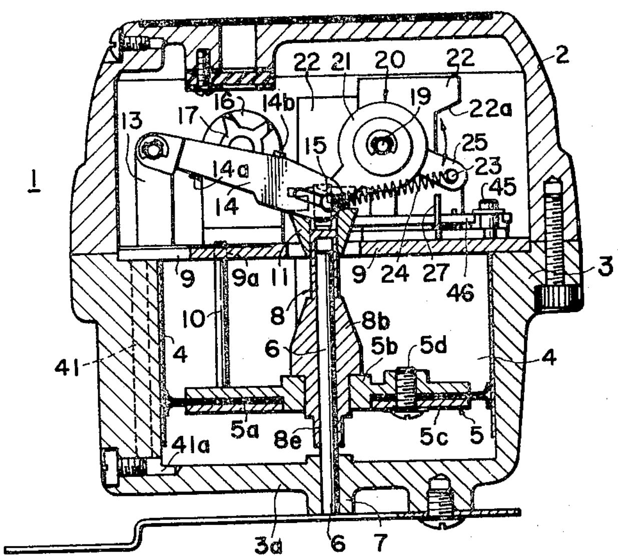
FIG. 1 is a view in longitudinal section of the assembly of the first embodiment of a piston type flow meter in accordance with the present invention.
Figure 2:
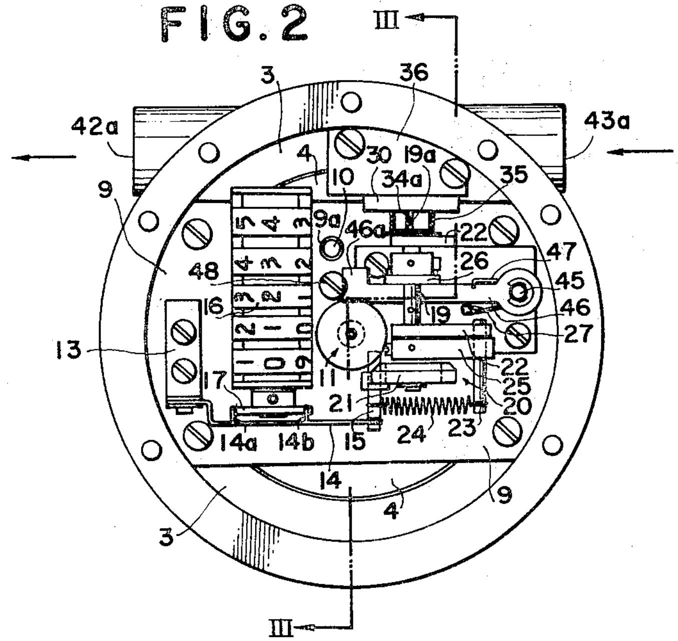
FIG. 2 is a plan of said embodiment in which the cover is removed.

In FIGS. 1 and 2, container 1 of the flow meter is composed of cover body 2 and main body 3, and in main body 3 a vertical cylinder 4 is provided. Piston 5 is slidably fitted in cylinder 4. Piston 5 is so formed that the edges of both packing discs 5*a* are bent in opposite directions to come into contact with cylinder 4 and said packing 5*a* is secured to fitting plate 5*b* by keeper plate 5*c* and screw 5*d*.

Figure 7A:
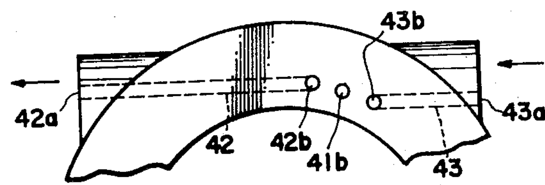
FIG. 7*a* is a fragmentary plan view showing the flow inlet and the flow outlet with a portion of the main body.
Figure 7B:
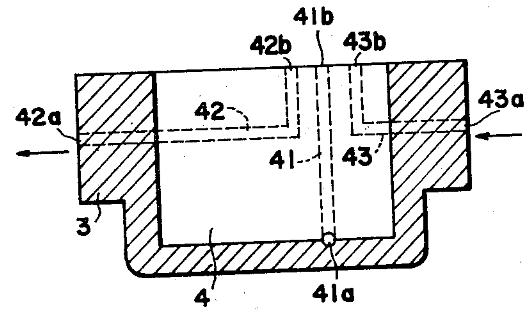
FIG. 7*b* is a sectional side view showing the flow course in said main body.

On the side of main body 3 there are oppositely provided flow outlet 42*a* and flow inlet 43*a*, and outlet 42*a* and inlet 43*a* communicate with flow course ends 42*b* and 43*b* via flow courses 42 and 43 passing through the thick wall of main body 3 (see FIG. 7*a* and FIG. 7*b*).

Guide shaft 6 in the center of cylinder 4 is engaged in boss 7 provided on bottom 3*a* of main body 3 and fitted slidably in through hole 8*e* passing straight through piston rod 8 fixed to piston 5 as described later, so that piston 5 may go up and down correctly relative to cylinder 4 at all times. The upper end of guide shaft 6 extends up to weir plate 9 fixed to the boundary between cover body 2 and main body 3.

Figures 3, 4A, 4B:
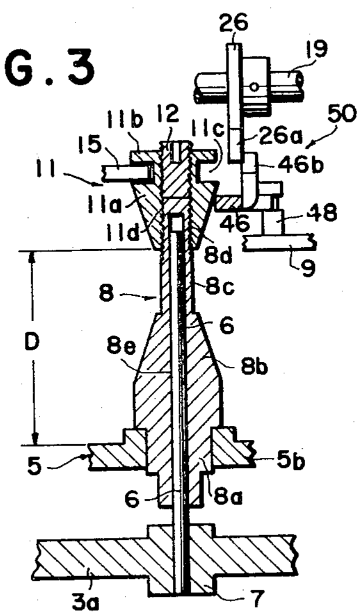
FIG. 3 is a fragmentary enlarged view around the piston rod of said embodiment and a sectional view taken stepwise along line III — III in FIG. 2 and viewed from the direction shown by the arrow.
FIG. 4*a* is a side view showing the meeting relation of every flow course in the change-over rotary valve, the valve seat body, and the main body in the angular position of said valve when the piston is at its lower limit.
FIG. 4*b* is a side view showing the meeting relation of every flow course in the angular position of said valve when the piston comes to its upper limit.

As shown in FIG. 3 piston rod 8 is fixed at its lower end thereof to fitting plate 5*b* of piston 5 and on the upper portion thereof conical portion 8*b* is formed as shown in FIG. 3 and on the upper end portion of slender cylindrical portion 8*c* thread 8*d* is provided. Thread 11*d* of quantity adjusting member 11, of a reverse conical shape described later, is meshed and, with said thread 8*d*.

Quantity adjusting member 11 is composed of reverse conical portion 11*a*, planar portion 11*b*, annular slot 11*c*, and screw pin 12, and so formed that screw pin 12 is screwed into thread portion 11*d* via a packing from the upper side and tightened up so that the setting position of quantity adjusting member 11 for piston rod 8 may not undergo a change on account of looseness. And, by said conical portion 8*b* and reverse conical portion 11*a* a cam is formed on piston rod 8, decreasing in diameter toward center.

Pin 10 is fixed on piston 5 as shown in FIG. 1 and passes through hole 9*a* formed in weir plate 9 to prevent turning of the piston about guide shaft 6 as a center while piston 5 is in operation.

Accordingly, even though the piston should operate in a condition not strictly perpendicular relative to the shaft 6, the exhaust flow quantity will not vary.

In FIG. 1, pin 15 which engages the fork end portion of the tip of swing arm 14 which is turnably supported on first bracket 13, fixed to the left side of weir plate 9, also engages annular slot 11c (FIG. 3) of the quantity adjusting member 11.

On opposite edges of swing arm 14 pawls 14*a* and 14*b* are provided, said pawls 14*a* and 14*b* and engaging alternately with driving ratchet 17 of integrating meter 16. Thus, the swing of arm 14 drives said meter 16 in one direction and the figures on said meter 16 are advanced one by one.

Pin 15 is mounted on one end of swing arm 21 journaled on tumbler shaft 19 by a ball bearing or the like.

Said shaft 19 is carried by second bracket 22, fixed at the bottom thereof to weir plate 9 and provided with two bend-up arm portions, and to said shaft 19 reversing arm 25 and engage member 26 are fixed in the order shown in FIG. 2.

On reversing arm 25 pin 23 is mounted in a position confronting pin 15 on swing arm 21, and said pin 23 and pin 15 on swing arm 21 are connected by spring 24.

Swing arm 21 and reversing arm 25 are pulled from both sides by spring 24 at all times, and yet pin 23 is restrained to the turning of a predetermined angle by notch 22*a* of second bracket 22, and thus tumbler mechanism 20 is formed for instantly reversing change-over rotary valve 30, described later, to rotate together with tumbler shaft 19 fixed to reversing arm 25, through the predetermined stroke of piston 5.

Said tumbler mechanism 20 comprises tumbler shaft 19, swing arm 21 fitted loosely on tumbler shaft 19, reversing arm 25 fixed to tumbler shaft 19, spring 24 for connecting said two arms, and second bracket 22.

Figure 5A:
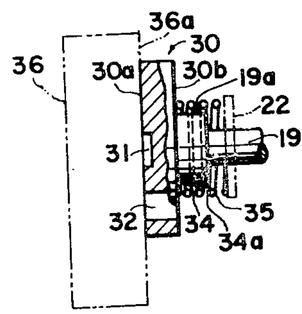
FIG. 5*a* is a fragmentary side view showing a section of a portion of said valve.
Figure 5B:
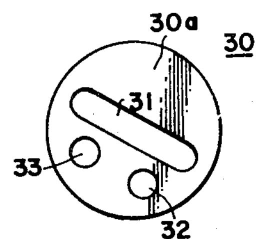
FIG. 5*b* is a front view of said valve.

Change-over rotary valve 30 is a planar shaped slide valve made of molded material such as Delrin and provided with long slot 31 passing through the center of sliding surface 30*a* for sliding on valve seat body 36 as shown in FIG. 5*a* and FIG. 5*b*, and in addition is provided with holes 32 and 33 passing through sliding plane 30*a* and back plane 30*b*.

On the back plane 30*b* a boss 34 is provided on which notched slot 34*a* is formed, and pin 19*a* provided on the elongated end of tumbler shaft 19 and said slot 34*a* are arranged to engage with each other so that rotary valve 30 turns with the turning of tumbler shaft 19.

In addition, a spring 35 is compressed between rotary valve 30 and the other arm of bracket 22 of tumbler shaft 19 and through the strength of said spring 35 the sliding plane 30*a* of rotary valve 30 slides in close contact with contact plane 36*a* of valve seat body 36.

Therefore, even though dust in kerosene comes into the valve said valve floats from the valve seat body to wash away the dust to the outside and accordingly the dust is eliminated from the sliding portion of the valve so as not to be adverse to its proper operation. And, even though the engagement of tumbler shaft 19 and rotary valve 30 is a little loose, working and assembling are easy.

Figure 6:
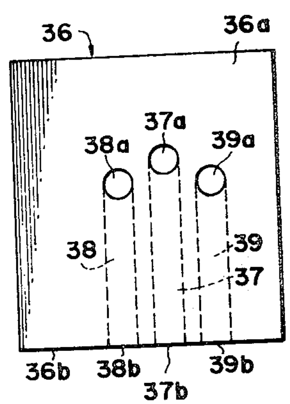
FIG. 6 is a front view of the valve seat body.

As shown in FIG. 6, valve seat body 36 is provided with three flow course mouths 37*a*, 38*a*, and 39*a* in positions to meet with long slot 31 of change-over rotary valve 30 and through holes 32 and 33, and flow courses 37, 38, and 39 are bent from valve contact plane 36*a* toward bottom plane 36*b* to pass through toward flow course ends 37*b*, 38*b*, and 39*b*.

Valve seat body 36 is fixed onto main body 3 by a screw as shown in FIG. 2.

As shown in FIG. 7*a* and FIG. 7*b*, the thick wall of the cylinder of main body 3 is formed to provide three flow course ends 41*b*, 42*b* and 43*b*, respectively, to correspond to flow course ends 37*b*, 38*b*, and 39*b* of valve seat body 36. Said flow course end 41*b* communicates with lower flow course mouth 41*a* (on the under side of piston 5) of cylinder 4 via flow course 41, said flow course end 42*b* communicates with flow outlet 42*a* of the flow meter via flow course 42, and said flow course end 43*b* communicates with flow inlet 43*a* of the flow meter via flow course 43.

Therefore, when change-over rotary valve 30 is located in the position shown in FIG. 4*a*, flow inlet 43*a* of the flow meter communicates with lower flow course mouth 41*a* (on the under side of the piston 5) via flow course 39 of valve seat body 36, long slot 31 of change-over rotary valve 30, flow course 37 of valve seat body 36, and flow course 41 of main body 3.

And, flow outlet 42*a* of the flow meter communicates with the inside of cover body 2 of the flow meter (on the upper side of piston 5) via flow course 42 of the main body, flow course 38 of valve seat body 36, and through hole 32 of change-over rotary valve 30.

And also, when change-over rotary valve 30 is located in the position turned as shown in FIG. 4*b*, contrary to the case described above (in the case of FIG. 4*a*), flow inlet 43*a* of the flow meter communicates with the inside of cover body 2 of the flow meter (the upper side of the piston), and flow outlet 42*a* of the flow meter communicates with lower flow course mouth 41*a* of the cylinder of the flow meter (the underside of the piston).

Figure 8A:
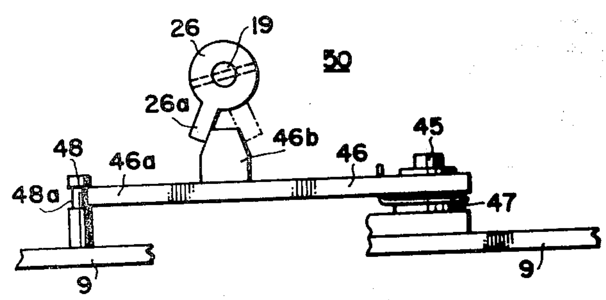
FIG. 8*a* is a fragmentary side view showing the circumference of the restraining lever of the restraining means in the tumbler mechanism in the first embodiment.

Restraining means 50 for regulating the reversing time of tumbler mechanism 20 is, as shown in FIG. 8*a*, composed of member 26 fixed to tumbler shaft 19, restraining lever 46, spring 47, and piston rod 8 (conical portion 8*b* and reverse conical portion 11*a*). Restraining lever 46, journaled on pin 45 provided on weir plate 9, regulates the piston stroke uniformly and given a counter-clockwise turning tendency by weak spring 47 round pin 45. Tip 46*a* of said lever 46 is in contact with the inclined surface of reverse conical portion 11*a* of quantity adjusting member 11 when piston 5 is located in the lower position as shown in FIG. 1 and on the contrary, in contact with the inclined surface of conical portion 8*b* of the piston rod when piston 5 is located in the upper position.

Near the left side of restraining lever 46 there is provided restraining pin 27 by which restraining lever 46 is prevented from turning excessively to the left.

Near the end portion of restraining lever 46 a guide pin 48 is provided on weir 9 and tip 46*a* of said lever 46 engage in guide slot 48*a* of said pin 48, and thereby when said lever 46 is turned it remains horizontal at all times.

A protrusion 46*b* is formed nearly at the center of restraining lever 46 in a position engageable with protrusion 26*a* of member 26 fixed to tumbler shaft 19. Normally (while the piston is moving) said protrusion 26*a* engages protrusion 46*b* and thereby the turning of member 26 is checked (see FIG. 8*b*). When piston 5 approaches its upper limit or lower limit, the contact position of tip 46*a* of restraining lever 46 with reverse conical portion 11*a* of quantity adjusting member 11, or conical portion 8*b* of piston rod 8 alters, that is, since tip 46*a* of restraining lever 46 comes into contact with the inclined portion of the conical shape restraining lever 46 turns clockwise and as shown in FIG. 3 the engagement of protrusion 46*b* of restraining lever 46 and protrusion 26*a* of member 26 is broken.

Figure 9:
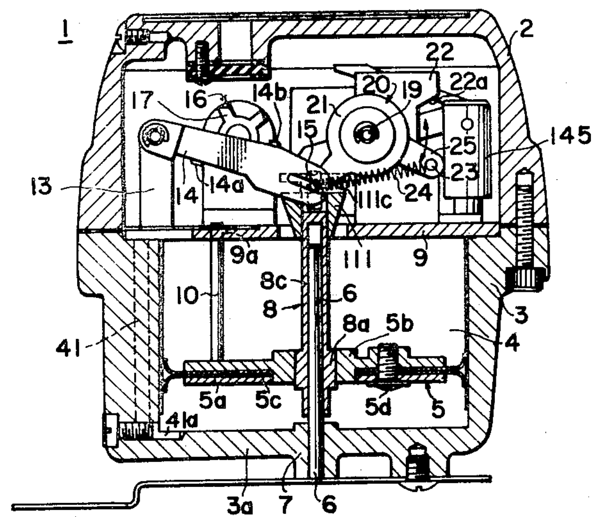
FIG. 9 is a longitudinal section of the assembly of the second embodiment of a flow meter in accordance with the present invention.

FIG. 9 shows the second embodiment of a flow meter in accordance with the present invention. Except restraining means 150 of tumbler mechanism 20 for regulating the change-over point of rotary valve 30, said second embodiment is almost the same as the first embodiment, therefore, for members which are nearly in the same form and function as those in the first embodiment, the same reference characters are used and accordingly the descriptions thereof are omitted.

Figure 11:
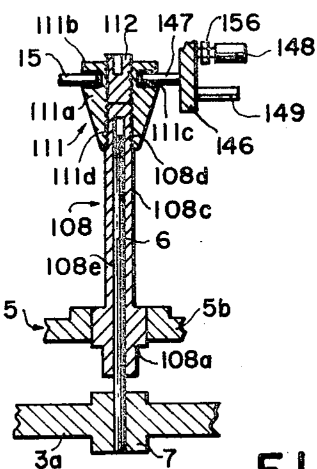
FIG. 11 is a fragmentary enlarged view around the piston rod of said second embodiment and a sectional view taken stepward along line XI — XI in FIG. 10 and viewed from the direction shown by the arrow.

The lower end 108*a* of piston rod 108 shown in FIG. 11 is fixed to fitting plate 5*b* of piston 5 and thread 108*d* on the upper end portion of the slender cylindrical portion 108*c* thereof engage with thread 111*d* of adjusting member 111 of reverse conical shape described later.

Adjusting member 111 is composed of reverse conical portion 111*a*, planar portion 111*b*, annular slot 111*c*, and screw pin 112, and into thread portion 111*d* screw pin 112 is screwed via a packing from the upper side so as to adjust the setting position of adjusting member 111 relative to piston rod 108 by tightening said screw pin 112.

Restraining means 150 (FIG. 12*a*) for regulating the reversing time point of tumbler mechanism 20 in the second embodiment is composed of member 126 fixed to tumbler shaft 19, release lever 146, restraining levers 151 and 152, and spring 153. Member 126 is cylindrical and provided axially with notched portions 126*a* and 126*b* engageable with pawls of restraining levers 151 and 152 respectively described later, nearly in symmetrical positions relative to the periphery of member 126.

Figure 10:
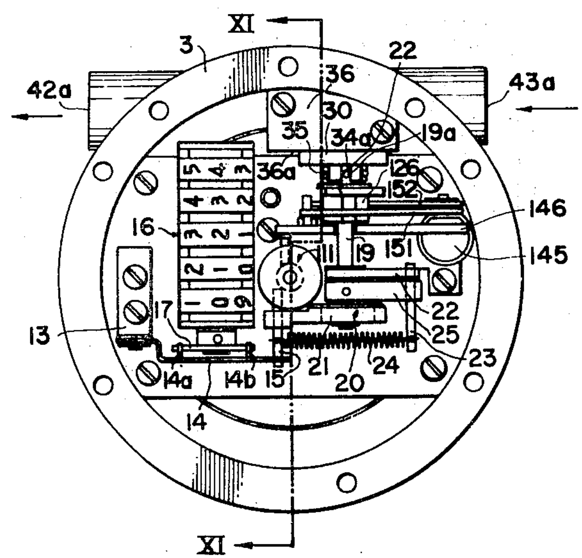
FIG. 10 is a plan of said embodiment with cover removed.
Figure 12A:
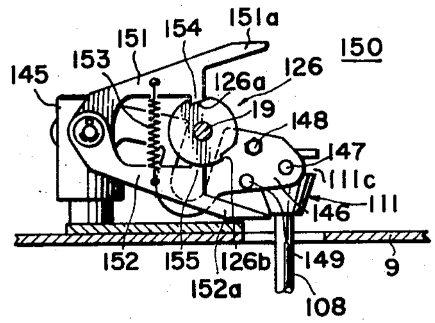
FIG. 12*a* is a side view showing the restraining means in the tumbler mechanism of said second embodiment.
Figure 12B:
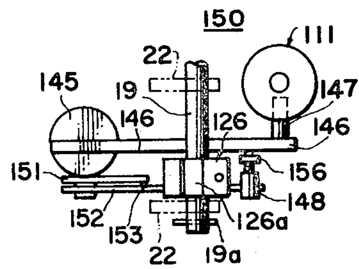
FIG. 12*b* is a plan of said restraining means.

In FIG. 10, release lever 146 fixed swingably to column 145 provided on weir 9 is provided with pins 148 and 149 (FIG. 12*a*) to come into contact with restraining levers 151 and 152 described later for controlling uniformly the piston stroke, and as shown in FIG. 12*a* and FIG. 12*b* pins 147 provided on the opposite side at the right end of lever 146 engage with annular slot 111*c* of adjusting member 111 on the head piston rod 108. The pins 148 and 149 provided facing this side near pin 147 are for controlling the upper limit and the lower limit of the piston stroke by coming into contact with restraining levers 151 and 152 described later.

Figure 12C:
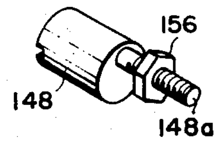
FIG. 12*c* is a perspective view showing the fine adjusting pin of said restraining means.

Pin 148 is a fine adjusting pin and as shown in FIG. 12*c* screw 148*a* is provided in an eccentric position of the pin body, which is turned and fixed by nut 156 so as to be able to move the position of pin 148 on release lever 146.

A pair of restraining levers 151, 152 of scissors shape are swingably fixed onto column 145 adjacent to release lever 146 (see FIG. 12*b*), and said restraining levers 151 and 152 are connected to each other by weak spring 153 so as to hold between them the perimeter of cylindrical member 126 fixed to tumbler shaft 19. The pawls 154 and 155, portions of said restraining levers 151 and 152, can engage with notches 126*a* and 126*b* provided on the perimeter of cylindrical member 126.

FIG. 12a shows the position of release lever 146 ascending a little after having descended to an extreme; therefore, the pin 149 is separated a little from restraining lever 152.

Now, while piston 5 is ascending, notch 126*a* of member 126 and pawl 154 of restraining lever 151 engage with each other, and the turning of member 126, namely, the turning of tumbler shaft 19 fixed thereto, is checked and accordingly the reversing of reverse arm 25 also is checked. When piston 5 comes near to the upper limit, pin 148 of release lever 146, ascending in connection therewith, engages with end portion 151*a* of restraining lever 151 to lift said lever 151, so that the engagement of pawl 154 and notch 126*a* of member 126 is interrupted.

When piston 5 comes near to the lower limit and pin 149 of release lever 146 engages with end portion 152*a* of restraining lever 152, restraining lever 152 is moved so that the engagement of pawl 155 and notch 126*b* of member 126 is interrupted.

Therefore, restraining means 150 in the second embodiment has the advantage, as compared with restraining means 50 in the first embodiment, that the engaged relation is easily effected, the size precision of the restraining lever and its fitting positions are not critical, and in addition the two pins to engage with said restraining lever are secured on the release lever going up and down together with the piston rod, one of which pins can be adjusted in position by turning, whereby assembling and adjusting the operation facilitated.

The operation of the present invention will now be described.

In the piston position shown in FIG. 1, change-over rotary valve 30 is located in the position shown in FIG. 4*a*, and flow inlet 43*a* of the flow meter communicates with flow course mouth 41*a* at the lower end of cylinder 4 (below the piston) via flow course 43, flow course 39 of valve seat body 36, long slot 31 of change-over rotary valve 30, flow course 37 of valve seat body 36, and flow course 41 of main body 3, and flow outlet 42*a* of the flow meter communicates with the inside of cover body 2 (above the piston) via flow course 42 of the main body, flow course 38 of valve seat body 36, and through hole 32 of change-over rotary valve 30. Therefore, the pressure of the fluid entering from flow inlet 43*a* pushes piston 5 upwards and the fluid above the piston flows to the outside from flow outlet 42*a*.

Meanwhile, as seen in FIG. 1, as piston 5 ascends through the fluid pressure, piston rod 8 also ascends therewith and pin 15 engaged therewith ascends also. Since swing arm 21 carrying pin 15 is journaled on tumbler shaft 19, said shaft 19 is not turned and only said arm 21 is turned upwardly, and change-over rotary valve 30 does not move; therefore, the flow course does not change. Swing arm 14 is turned upwardly together with swing arm 21.

Figure 8B:
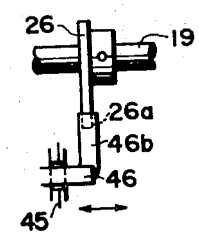
FIG. 8*b* is a fragmentary side view on the right side showing the engaging relation of said restraining lever and the engaged member.

As swing arm 21 is turned and when said arm 21 and the end of reverse arm 25 go past a straight line tumbler mechanism 20 operates and said arm 25 is urged upwardly by spring 24; however, protrusion 46*b* of restraining lever 46 engages with protrusion 26*a* of member 26, so that reverse arm 25 coaxial therewith does not move (see FIG. 8*a* and FIG. 8*b*). And, as piston 5 ascends further it comes into contact with the inclined surface of conical portion 8*b* of the piston rod, and when restraining lever 46 is turned further clockwise, and when the restraint of protrusion 26*a* and protrusion 46*b* of said lever 46 is removed arm 25 is moved upward by spring 24.

Meanwhile, swing arm 14 also is turned upward, driving ratchet 17 of integrating indicator 16 engages with pawl 14*a*, and the indicating scale is moved up by one figure.

Thereupon, through the turning of tumbler shaft 19 by reverse arm 25, change-over rotary valve 30 also is turned to the position shown in FIG. 4*b*. And, flow inlet 43*a* and flow outlet 42*a* and the flow course in the inside of the flow meter are connected to each other, so that flow outlet 42*a* communicates with flow course mouth 41*a* on the lower portion of the cylinder (the lower side of the piston), and flow inlet 43*a* communicates with the inside of the cover body (the upper side of the piston).

Therefore, piston 5 is pushed down by the pressure of the fluid entered from flow inlet 43*a* and the fluid on the downward side of the piston is exhausted to the outside from flow outlet 42*a*.

Meanwhile, as piston 5 descends and pin 15 engaged with annular slot 11*c* of quantity adjusting member 11, coupled with piston rod 8 by a screws comes down, swing arm 14 engaged therewith and swing arm 21 are also turned downwardly.

Through the turning of swing arm 14 pawl 14*b* engages with the ratchet of integrating indicator 16 and the scale of indicator 16 is further moved up by one figure. And, tip 46*a* of restraining lever 46, shown in FIG. 3, comes into contact with the inclined surface of reverse conical portion 11*a* of quantity adjusting member 11 and said lever 46 is turned clockwise, so that the engagement of protrusion 26*a* of member 26 and protrusion 46*b* of restraining lever 46 is relieved, tumbler mechanism 20 operates, and reverse arm 25 is turned downwardly to the state shown in FIG. 1. Therefore, tumbler shaft 19 is turned and change-over rotary valve 30 is reversed to return to the position shown in FIG. 4*a*. By repeating such action the piston moves continuously up and down through the pressure of the fluid entering from flow inlet 43*a* and it is possible to measure the flow rate of the fluid through the meter from the product of the strokes of the piston multiplied by the sectional area of the cylinder.

Furthermore, the dial of integrating indicator 16 is arranged to advance figures of the scale one by one with each stroke of the piston, and by setting up to indicate the flow rate of one stroke on the indicator it is possible to see the flow rate at a glance of indicator 16.

Therefore, when the flow rate is too small it is only required to elongate the stroke and when the flow rate is too much it is only required to shorten the stroke.

Quantity adjusting member 11 shown in FIG. 3 can effect simply the quantity adjustment described above, and by loosening screw pin 12 the quantity adjusting member 11 can be turned to change clearance D between piston 5 and quantity adjusting member 11 and by tightening screw pin 12, the new position of quantity adjusting member 11 can be fixed.

For example, when clearance D between piston 5 and quantity adjusting member 11 is elongated, the time before engagement of a particular position on the surface of reverse conical portion 11*a* of quantity adjusting member 11 and restraining lever 46 is elongated, and as a result the reversing time of change-over rotary valve 30 effected by operation of tumbler mechanism 20 and restraining means 50 is elongated, therefore, the piston stroke is elongated and accordingly it is possible to increase the exhaust quantity brought about by one stroke.

And, to the contrary when clearance D is shortened the piston stroke is shortened and the exhaust quantity brought about by one stroke can be reduced and thereby mechanical error of the meter can be adjusted.

In the next place, in the second embodiment the motion thereof is the same as in the case of the first embodiment, so that only the operation of restraining means 150 of tumbler mechanism 20 will be described hereinafter.

Through the pressure of the fluid entered from flow inlet 43*a* of the container, when piston 5 is pushed up swing arm 21 engaged therewith is turned and when said arm 21 and the end of reverse arm 25 go past a straight line tumbler mechanism 20 operates and said arm 25 is urged toward the upper position, however, reverse arm 25 and member 126 are fixed to the same shaft (tumbler shaft 19) and pawl 154 of the restraining lever 151 is engaged with notch 126*a* of member 126, so that reverse arm 25 is restrained as it is.

When the piston further ascends, pin 148 of release lever 146 engages with the end portion of restraining lever 151 to lift said lever 151, so that the restraint of pawl 154 and notch 126*a* of the restraining member is removed and the turning of the restraining member (tumbler shaft 19) becomes possible and reverse arm 25 is reversed upward by spring 24. At the same time notch 126b on the lower side of member 126 engages with pawl 155 of restraining lever 152.

Thereupon, on account of the change-over of rotary valve 30, flow inlet 43*a* communicates with the upper side of piston 5, so that piston 5 is pushed down by the pressure of fluid.

And, when piston 5 comes to the lower limit pin 149 provided on release lever 146 shown in FIG. 12*a* engages with end portion 152*a* of restraining lever 152 and the restraint of pawl 155 of said lever 152 and notch 126*b* of engage member 126 is removed, so that tumbler mechanism 20 is operated and reverse arm 25 is reversed downward to turn to the original state shown in FIG. 9 in the same way as in the case of the first embodiment.

Pin 148 for the fine adjustment shown in FIGS. 12*a*, 12*b*, and 12*c* can effect the quantity adjustment very simply and reliably, and when said pin main body 148 is turned and fixed onto release lever 146 by lock nut 156, the engagement position of pin main body 148 and restraining lever 151 changes because screw lug 148*a* is planted eccentrically relative to main body 148, and accordingly it is possible to advance or retard the time of engagement. That is, it is possible to elongate or shorten the piston stroke, and by turning said pin 148 for fine adjustment it is possible to increase or decrease the exhaust quantity of the meter.

Figure 13:
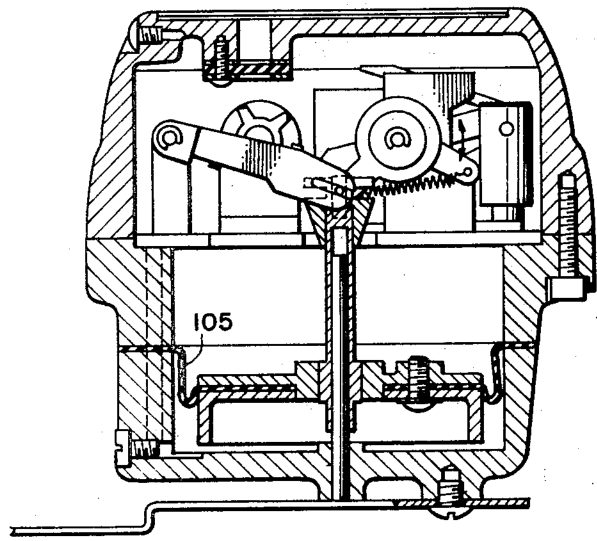
FIG. 13 is a longitudinal section showing another embodiment making use of a diaphragm instead of the piston.

FIG. 13 illustrates that it is possible to replace piston 5 in the first and second embodiments with diaphragm 105 and the motion in this case is quite the same as in the first and second embodiments, so that the description is omitted herefrom.

Since the perimeter of diaphragm 105 is fixed to the main body, pin 10 for preventing the turning of the piston becomes unnecessary and since there is no sliding movement the cylinder liner becomes unnecessary also.

What is claimed is:

1. A piston type flow meter of the type comprising:

a piston;
a container having two chambers divided by said piston, and provided with a flow inlet and a flow outlet;
a change-over rotary valve supported rotatably on said container for selectively connecting said two chambers to said flow inlet and said flow outlet;
tumbler mechanism including a shaft connected to said rotary valve for reversing the same in response to the stroke of said piston; and
an indicator driven by the stroke of said piston; characterized by the provision of restraining means comprising:
a piston rod fixed to said piston and provided with two conical members each having a diameter reducing in size toward the other said conical member;
a restraining lever engageable with the said conical members of said piston rod to swing laterally as said piston rod moves; and
a member engageable with and disengageable from said restraining lever and fixed to said tumbler shaft of said rotary valve.

2. A piston type flow meter as defined in claim 1, characterized in that one conical member of said piston rod is arranged to be adjustable in position relative to said rod, the engagement and disengagement between said lever and said member being adjustable by changing the position of said adjustable conical member.

3. A piston type flow meter as claimed in claim 2, wherein said piston has a pin secured thereon for preventing the rotation of the piston, said container including a weir-plate having a hole and said pin extending loosely through the said hole.

4. A piston type flow meter of the type comprising:

a piston having a piston rod;
a container having two chambers divided by said piston, a flow inlet and a flow outlet;
a change-over rotary valve supported rotatably on said container for selectively connecting said two chambers to said flow inlet and said flow outlet, said valve having a shaft;
tumbler mechanism operatively connected to said shaft for reversing said rotary valve in response to the stroke of said piston; and
an indicator driven by the stroke of said piston; and characterized in providing restraining means comprising:
a release lever for engaging with said piston rod so as to swing as said piston rod moves;
two pins projecting from said release lever;
a notched member fixed to said shaft of said change-over rotary valve;
a pair of restraining pawls engaged with and disengaged from said notched member when said pins respectively disengage and engage said pawls in opposed positions of said piston.

5. A piston type flow meter as defined in claim 4, wherein at least one of said pins is secured to said release lever by screw means eccentric to the axis of said pin, said pin axis being adapted to rotate about said screw means to vary the relation of said pin and said lever, whereby the instrumental error of the flow meter can be adjusted.

6. A piston type flow meter as defined in claim 5, wherein said piston has a pin secured thereon for preventing the rotation of the piston, said container having a weir plate having a hole and said piston pin extending loosely through said hole.

* * * * *